(12) United States Patent
Lu et al.

(10) Patent No.: US 8,180,837 B2
(45) Date of Patent: *May 15, 2012

(54) IMAGE SPAM FILTERING BASED ON SENDERS' INTENTION ANALYSIS

(75) Inventors: Jun Lu, Nepean (CA); Jiandong Cheng, Ottawa (CA)

(73) Assignee: Fortinet, Inc., Sunnyvale, CA (US)

( * ) Notice: Subject to any disclaimer, the term of this patent is extended or adjusted under 35 U.S.C. 154(b) by 565 days.

This patent is subject to a terminal disclaimer.

(21) Appl. No.: 12/114,815

(22) Filed: May 4, 2008

(65) Prior Publication Data

US 2009/0110233 A1    Apr. 30, 2009

Related U.S. Application Data

(63) Continuation of application No. 11/932,589, filed on Oct. 31, 2007.

(51) Int. Cl.
*G06F 15/16* (2006.01)
*G06K 9/00* (2006.01)

(52) U.S. Cl. ...................................... 709/206

(58) Field of Classification Search ........... 709/204–207
See application file for complete search history.

(56) References Cited

U.S. PATENT DOCUMENTS

| | | | | |
|---|---|---|---|---|
| 6,738,496 | B1 * | 5/2004 | Van Hall | 382/101 |
| 6,772,196 | B1 * | 8/2004 | Kirsch et al. | 709/206 |
| 2004/0221062 | A1 * | 11/2004 | Starbuck et al. | 709/246 |
| 2005/0204005 | A1 * | 9/2005 | Purcell et al. | 709/206 |
| 2006/0123083 | A1 * | 6/2006 | Goutte et al. | 709/206 |
| 2007/0168436 | A1 | 7/2007 | Andam | |
| 2008/0091765 | A1 * | 4/2008 | Gammage et al. | 709/202 |
| 2009/0113003 | A1 | 4/2009 | Lu | |

OTHER PUBLICATIONS

Final Office Action for U.S. Appl. No. 11/932,589 mailed Mar. 15, 2010.
Non-Final Office Action for U.S. Appl. No. 11/932,589 mailed Oct. 16, 2009.
Zhao, M. "Image Thresholding Technique Based on Fuzzy Partition and Entropy Maximization" School of Electrical and Information Engineering. Dec. 2004.
Gonzales, R.C. et al., "Digital Processing" Third Edition. 120 Pages, 2008.
Young, I.T. et al., "Fundamentals of Image Processing" 113 pages, 1998.

(Continued)

*Primary Examiner* — Ian N Moore
*Assistant Examiner* — Thai Nguyen
(74) *Attorney, Agent, or Firm* — Hamilton, DeSanctis & Cha LLP

(57) ABSTRACT

Systems and methods for an anti-spam detection module that can detect image spam are provided. According to one embodiment, an image spam detection process involves determining and measuring various characteristics of images that may be embedded within or otherwise associated with an electronic mail (email) message. An approximate display location of the embedded images is determined. The existence of one or more abnormal factors associated with the embedded images is identified. A quantity of text included in the one or more embedded images is determined and measured by analyzing one or more blocks of binarized representations of the one or more embedded images. Finally, the likelihood that the email message is spam is determined based on one or more of the approximate display location, the existence of one or more abnormal factors and the quantity and location of text measured.

41 Claims, 13 Drawing Sheets

OTHER PUBLICATIONS

Information Theoretic Image Thresholding. http://www.case.monash.edu.au/hons/projects/2002/Laura.Frost. 10 pages, Oct. 16, 2007.

Portes de Albuquerque, M. et al., "Image Thresholding Using Tsallis Entropy" Pattern Recognition Letters 25 (2004) 1059-1065.

Spammers Embed Images in PDF Files to Bypass Spam Filtering Software. http//www.securitypark.co.uk/security_article259855.html. 2pages, Aug. 23, 2007.

Trier, O.D. et al., "Evaluation of Binarization Methods for Document Images" 6 pages, 1995.

Attachment Spam—The Latest Trend. GFI-White Paper. 7 pages, 2007.

* cited by examiner

— 1010

Investor Alert! WE HAVE A RUNNER!!!

TRADE DATE: THURSDAY, NOVEMBER 16, 2006
COMPANY: MOBICOM COMMUNICATIONS
SYMBOL: MBMC
CURRENT PRICE: $6
7 DAY TARGET: $12

When this Stock moves... WATCH OUT! MBMC is a high growth issue and should be purchased by stock traders and those that can afford to make quick money on these fast moving issues. This is your chance to get your hands on one of these fast moving stocks and take short term profits. This Stock could reach record highs in the near future. We feel this is a "Stock Alert" and you should have this on your Radar. Big news expected. This stock will explode! Do not wait until it is too late!!!

Investor Alert! WE HAVE A RUNNER!!!
TRADE DATE: THURSDAY, NOVEMBER 16, 2006
COMPANY: MOBICOM COMMUNICATIONS
SYMBOL: MBMC
CURRENT PRICE: $6
7 DAY TARGET: $12

When this Stock moves... WATCH OUT! MBMC is a high growth issue and should be purchased by stock traders and those that can afford to make quick money on these fast moving issues. This is your chance to get your hands on one of these fast moving stocks and take short term profits. This stock could reach record highs in the near future. We feel this is a "Stock Alert" and you should have this on your Radar. Big news expected. This stock will explode! Do not wait until it is too late!!!

IMAGE SPAM FILTERING BASED ON SENDERS' INTENTION ANALYSIS

CROSS-REFERENCE TO RELATED APPLICATIONS

This application is a continuation of U.S. application Ser. No. 11/932,589 filed on Oct. 31, 2007, which is hereby incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2007, Fortinet, Inc.

BACKGROUND

1. Field

Embodiments of the present invention generally relate to the field of spam filtering and anti-spam techniques. In particular, various embodiments relate to image analysis and methods for combating spam in which spammers use images to carry the advertising text.

2. Description of the Related Art

Image spam was originally created in order to get past heuristic filters, which block messages containing words and phrases commonly found in spam. Since image files have different formats than the text found in the message body of an electronic mail (email) message, conventional heuristic filters, which analyze such text do not detect the content of the message, which may be partly or wholly conveyed by embedded text within the image. As a result, heuristic filters were easily defeated by image spam techniques.

To address this spamming technique, fuzzy signature technologies, which flag both known and similar messages as spam, were deployed by anti-spam vendors. Such fuzzy signature technologies allowed message attachments to be targeted, thereby recognizing as spam messages with different content but the same attachment.

Spammers now alter the images to make the email message appear different to signature-based filtering approaches yet while maintaining readability of the embedded text message to human viewers. The content of images lies in two levels: (i) the pixel matrix and (ii) the text or graphics these pixel matrices represent. At present, the notion of pixel-based matching does not make sense, as the same text could be represented by countless pixel matrices by simply changing various attributes, such as the font, size, color or by adding noise. Therefore, hash matching and other signature-based approaches have essentially been rendered useless to block image spam as they fail as a result of even minor changes to the background of the image.

Some vendors have attempted to catch image spam by employing Optical Character Recognition (OCR) techniques; however, such approaches have only limited success in view of spammers' use of techniques to obscure the embedded text messages with a variety of noise. FIGS. 1A and 1B illustrate sample images and obfuscation techniques used by spammers to defeat OCR image spam detection techniques. As shown in FIGS. 1A and 1B, polygons, lines, random colors, jagged text, random dots, varying borders and the like may be inserted into image spam in an attempt to defeat signature detection techniques and obscure the embedded text from OCR techniques. There are an almost infinite number of ways that spammers can randomize images. In addition to the foregoing obfuscation techniques, spammers have recently used techniques such as varying the colors used in an image, changing the width and/or pattern of the border, altering the font style, and slicing images into smaller pieces (which are then reassembled to appear as a single image to the recipient). Meanwhile, OCR is very computationally expensive. Depending upon the implementation, fully rendering a message and then looking for word matches against different character set libraries may take as long as several seconds per message, which is typically unacceptable for many contexts.

SUMMARY

Systems and methods are described for an anti-spam detection module that can detect image spam. According to one embodiment, an embedded image of an electronic mail (email) message is converted to a binarized representation by performing thresholding on a grayscale representation of the embedded image. A quantity of text included in the embedded image is then determined and measured by analyzing one or more blocks of the binarized representations. Finally, the email message is classified as spam or clean based at least in part on the quantity of text measured.

In one embodiment, the embedded image may be formatted in accordance with the Graphic Interchange Format (GIF), Joint Photographic Experts Group (JPEG) or Portable Network Graphics (PNG) formats/standards.

In one embodiment, the embedded image may be an image contained within a file attached to the email message.

In one embodiment, the method also includes determining an approximate display location of an embedded image within the email message and identifying existence of one or more abnormal factors associated with the embedded image. Then, the classification can be based upon the approximate display location, the existence of one or more abnormal factors as well as the quantity of text measured.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 10 is a binary image resulting from thresholding the grayscale image of FIG. 8 in accordance with an embodiment of the present invention.

FIG. 11 illustrates an exemplary segmentation of the binary image of FIG. 10 into 28 virtual blocks and highlights the text strings detected within the blocks in accordance with an embodiment of the present invention.

DETAILED DESCRIPTION

Figure 1A:
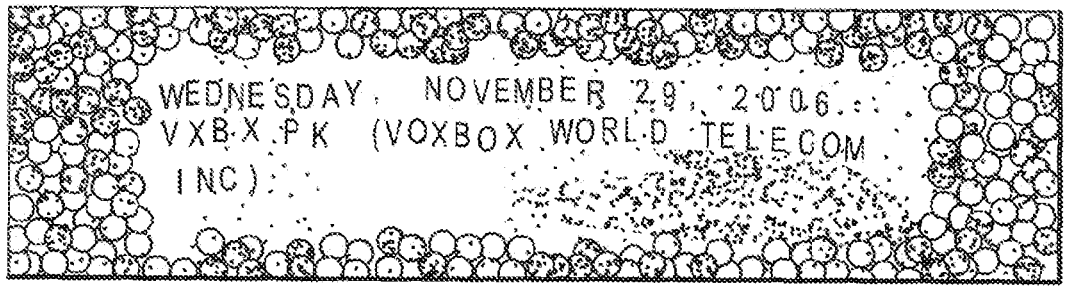
FIGS. 1A and 1B illustrate sample images and obfuscation techniques used by spammers to defeat OCR image spam detection techniques.
Figure 1B:
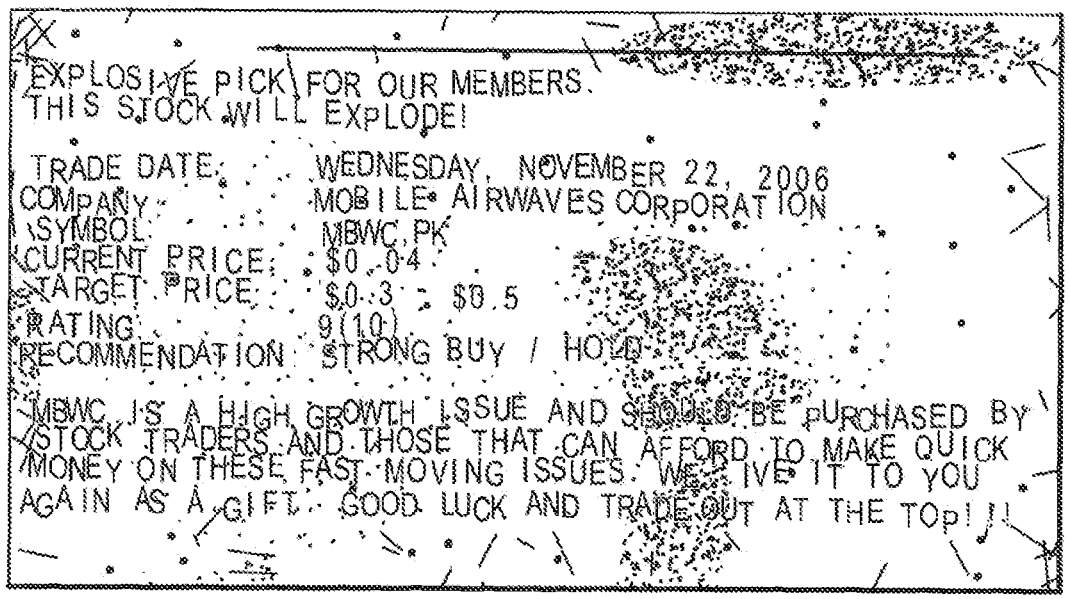

Systems and methods are described for an anti-spam detection module that can detect various forms of image spam. According to one embodiment, images attached to or embedded within email messages are analyzed to determine the senders' intention. Empirical analysis reveals legitimate emails may contain embedded images, but valid images sent through email rarely contain a substantial quantity of text. Additionally, when legitimate images are included within email messages, the senders of such email messages do not painstakingly adjust the location of such included images to assure such images appear in the preview window of an email client. Furthermore, legitimate senders do not intentionally inject noise into the embedded images. In contrast, spammers usually compose email messages in different ways. For example, in the context of image spam, spammers insert text into images to avoid filtering by traditional text filters and employ techniques to randomize images and/or obscure text embedded within images. Spammers also typically make great efforts to draw attention to their image spam by carefully placing the image in such a manner as to make it visible to the recipient in the preview window/pane of an email client that supports HTML email, such as Netscape Messenger or Microsoft Outlook. Consequently, various indicators of image spam include, but are not limited to, inclusion of one or more images in the front part of an email message, inclusion of one or more images containing text meeting a certain threshold and/or inclusion of one or more images into which noise appears to have been injected to obfuscate embedded text.

According to one embodiment, various image analysis techniques are employed to more accurately detect image spam based on senders' intention analysis. The goal of senders' intention analysis is to discover the email message sender's intent by examining various characteristics of the email message and the embedded or attached images. If it appears, for example, after performing image analysis that one or more images associated with an email message have had one or more obfuscation techniques applied, the intent is to draw attention to the one or more images and/or the one or more images include suspicious quantities of text, then the sender's intention analysis anti-spam processing may flag the email message at issue as spam. In one embodiment, the image scanning spam detection method is based on a combination of email header analysis, email body analysis and image processing on image attachments.

Importantly, although various embodiments of the anti-spam detection module and image scanning methodologies are discussed in the context of an email security system, they are equally applicable to network gateways, email appliances, client workstations, servers and other virtual or physical network devices or appliances that may be logically interposed between client workstations and servers, such as firewalls, network security appliances, email security appliances, virtual private network (VPN) gateways, switches, bridges, routers and like devices through which email messages flow. Furthermore, the anti-spam techniques described herein are equally applicable to instant messages, (Multimedia Message Service) MMS messages and other forms of electronic communications in the event that such message become vulnerable to image spam in the future.

Additionally, various embodiments of the present invention are described with reference to filtering of incoming email messages. However, it is to be understood, that the filtering methodologies described herein are equally applicable to email messages originated within an enterprise and circulated internally or outgoing email messages intended for recipients outside of the enterprise. Therefore, the specific examples presented herein are not intended to be limiting and are merely representative of exemplary functionality.

Furthermore, while, for convenience, various embodiments of the present invention may be described with reference to detecting image spam in the graphic/image file formats currently most prevalent (i.e., Graphic Interchange Format (GIF), Joint Photographic Experts Group (JPEG) and Portable Network Graphics (PNG) graphic/image file formats), embodiments of the present invention are not so limited and are equally applicable to various other current and future graphic/image file formats, including, but not limited to, Progressive Graphics File (PGF), Tagged Image File Format (TIFF), bit mapped format (BMP), HDP, WDP, XPM, MacOS-PICT, Irix-RGB, Multiresolution Seamless Image Database (MrSID), RAW formats used by various digital cameras, various vector formats, such as Scalable Vector Graphics (SVG), as well as other file formats of attachments which may themselves contain embedded images, such as Portable Document Format (PDF), Encapsulated PostScript, SWF, Windows Metafile, AutoCAD DXF and CorelDraw CDR.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a non-transitory machine-readable storage medium having stored thereon instructions, which may be used to program a computer (or other electronic devices) to perform a process. The non-transitory machine-readable storage medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of non-transitory media/machine-readable medium suitable for storing electronic instructions.

Terminology

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrase "embedded image" generally refers to an image that is displayed or rendered inline within a styled or formatted electronic message, such as a HyperText Markup Language (HTML)-based or formatted email message. As used herein, the phrase "embedded image" is intended to encompass scenarios in which the image data is sent with the email message and linked images in which a reference to the image is sent with the email message and the image data is retrieved once the recipient views the email message. The phrase "embedded image" also includes an image that is embedded in other file formats of attachments, such as Portable Document Format (PDF) attachments, in which the image data is displayed to the email recipient when the attachment is viewed.

The phrase "image spam" generally refers to spam in which the "call to action" of the message is partially or completely contained within an embedded file attachment, such as a .gif or .jpeg or .pdf file, rather than in the body of the email message. Such images are typically automatically displayed to the email recipients and typically some form of obfuscation is implemented in an attempt to hide the true content of the image from spam filters.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

The phrase "network gateway" generally refers to an internetworking system, a system that joins two networks together. A "network gateway" can be implemented completely in software, completely in hardware, or as a combination of the two. Depending on the particular implementation, network gateways can operate at any level of the OSI model from application protocols to low-level signaling.

If the specification states a component or feature "may", "can", "could", or "might" be included or have a characteristic, that particular component or feature is not required to be included or have the characteristic.

The term "proxy" generally refers to an intermediary device, program or agent, which acts as both a server and a client for the purpose of making or forwarding requests on behalf of other clients.

The term "responsive" includes completely or partially responsive.

The term "server" generally refers to an application, program, process or device in a client/server relationship that responds to requests for information or services by another program, process or device (a server) on a network. The term "server" also encompasses software that makes the act of serving information or providing services possible.

The term "spam" generally refers to electronic junk mail, typically bulk electronic mail (email) messages in the form of commercial advertising. Often, email message content may be irrelevant in determining whether an email message is spam, though most spam is commercial in nature. There is spam that fraudulently promotes penny stocks in the classic pump-and-dump scheme. There is spam that promotes religious beliefs. From the recipient's perspective, spam typically represents unsolicited, unwanted, irrelevant, and/or inappropriate email messages, often unsolicited commercial email (UCE). In addition to UCE, spam includes, but is not limited to, email messages regarding or associated with fraudulent business schemes, chain letters, and/or offensive sexual or political messages.

According to one embodiment "spam" comprises Unsolicited Bulk Email (UBE). Unsolicited generally means the recipient of the email message has not granted verifiable permission for the email message to be sent and the sender has no discernible relationship with all or some of the recipients. Bulk generally refers to the fact that the email message is sent as part of a larger collection of email messages, all having substantively identical content. In embodiments in which spam is equated with UBE, an email message is considered spam if it is both unsolicited and bulk. Unsolicited email can be normal email, such as first contact enquiries, job enquiries, and sales enquiries. Bulk email can be normal email, such as subscriber newsletters, customer communications, discussion lists, etc. Consequently, in such embodiments, an email message would be considered spam (i) the recipient's personal identity and context are irrelevant because the email message is equally applicable to many other potential recipients; and (ii) the recipient has not verifiably granted deliberate, explicit, and still-revocable permission for the email message to be sent.

The phrase "transparent proxy" generally refers to a specialized form of proxy that only implements a subset of a given protocol and allows unknown or uninteresting protocol commands to pass unaltered. Advantageously, as compared to a full proxy in which use by a client typically requires editing of the client's configuration file(s) to point to the proxy, it is not necessary to perform such extra configuration in order to use a transparent proxy.

Figure 2:
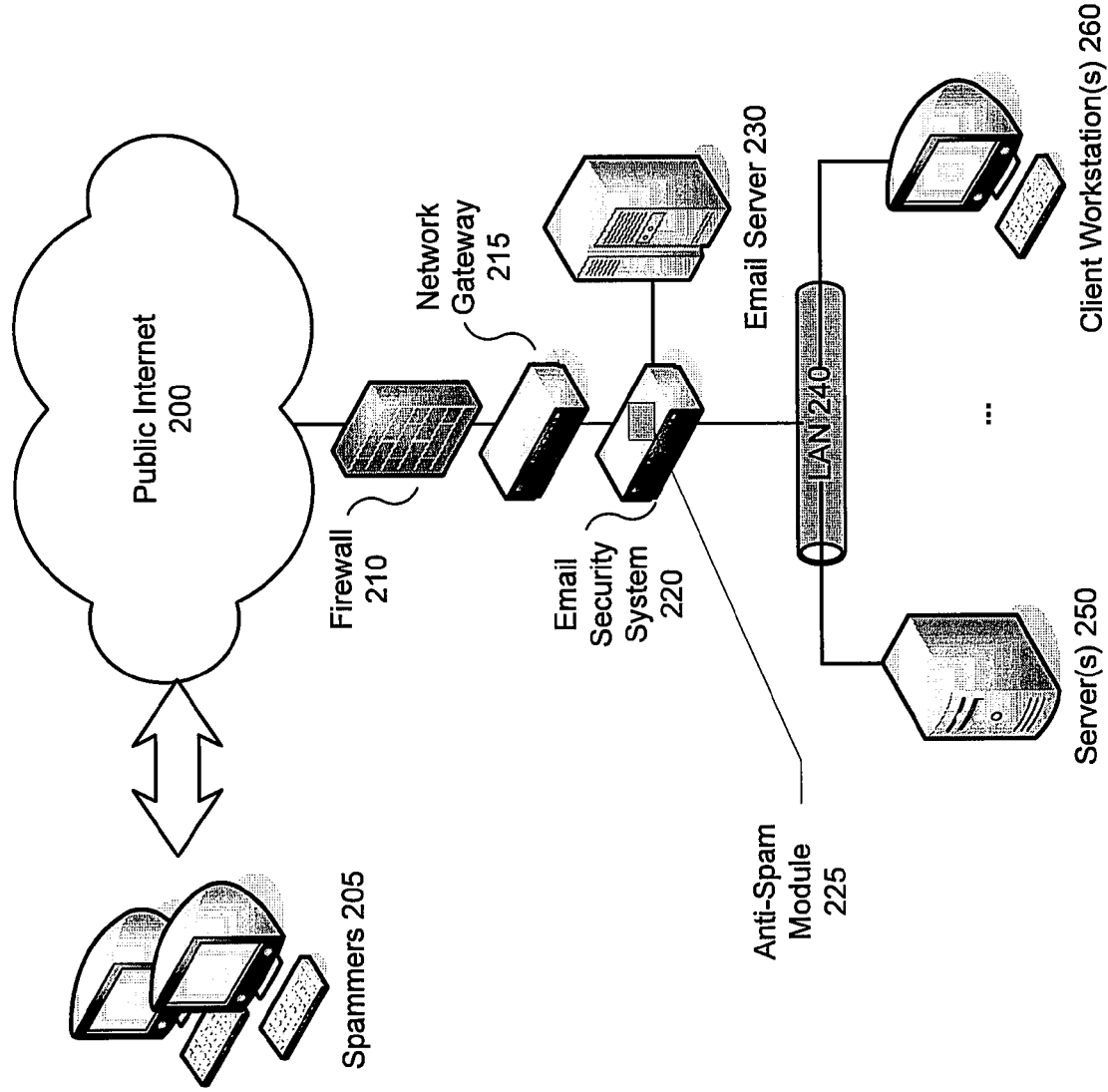
FIG. 2 is a block diagram conceptually illustrating a simplified network architecture in which embodiments of the present invention may be employed.

FIG. 2 is a block diagram conceptually illustrating a simplified network architecture in which embodiments of the present invention may be employed. In this simple example, spammers 205 are shown coupled to the public Internet 200 to which local area network (LAN) 240 is also communicatively coupled through a firewall 210, a network gateway 215 and an email security system 220, which incorporates within an anti-spam module 225 various novel image spam detection methodologies that are described further below.

In the present example, the email security system 220 is logically interposed between spammers and the email server 230 to perform spam filtering on incoming email messages from the public Internet 200 prior to receipt and storage on the email server 230 from which and through which client workstations 260 residing on the LAN 240 may retrieve and send email correspondence.

In the exemplary network architecture of FIG. 2, the firewall 210 may represent a hardware or software solution configured to protect the resources of LAN from outsiders and to control what outside resources local users have access to by enforcing security policies. The firewall 210 may filter or disallow unauthorized or potentially dangerous material or content from entering LAN 240 and may otherwise limit access between the LAN 240 and the public Internet 200 in accordance with local security policy established and maintained by an administrator of LAN 240.

In one embodiment, the network gateway 215 acts as an interface between the LAN 240 and the public Internet 200. The network gateway 215 may, for example, translate between dissimilar protocols used internally and externally to the LAN 240. Depending upon the distribution of functionality, the network gateway 215 or the firewall 210 may perform network address translation (NAT) to hide private Internet Protocol (IP) addresses used within LAN 240 and enable multiple client workstations, such as client workstations 260, to access the public Internet 200 using a single public IP address.

According to one embodiment, the email security system 220 performs email filtering to detect, tag, block and/or remove unwanted spam and malicious attachments. In one embodiment, an anti-spam module 225 of the email security system 220, performs one or more spam filtering techniques, including but not limited to, sender IP reputation analysis and content analysis, such as attachment/content filtering, heuristic rules, deep email header inspection, spam URI real-time blacklists (SURBL), banned word filtering, spam checksum blacklist, forged IP checking, greylist checking, Bayesian classification, Bayesian statistical filters, signature reputation, and/or filtering methods such as FortiGuard-Antispam, access policy filtering, global and user black/white list filtering, spam Real-time Blackhole List (RBL), Domain Name Service (DNS) Block List (DNSBL) and per user Bayesian filtering so that individual users can set their own profiles.

The anti-spam module 225 also performs various novel image spam detection methodologies or spam image analysis scanning based on sender's intention analysis in an attempt to detect, tag, block and/or remove spam presented in the form of one or more images. Examples of the image analysis techniques and the sender's intention analysis methodologies are described in more detail below. Existing email security platforms that exemplifies various operational characteristics of the email security system 220 according to an embodiment of the present invention include the FortiMail™ family of high-performance, multi-layered email security platforms, including the FortiMail-100 platform, the FortiMail-400 platform, the FortiMail-2000 platform and the FortiMail-4000A platform all of which are available from Fortinet, Inc. of Sunnyvale, Calif.

Figure 3:
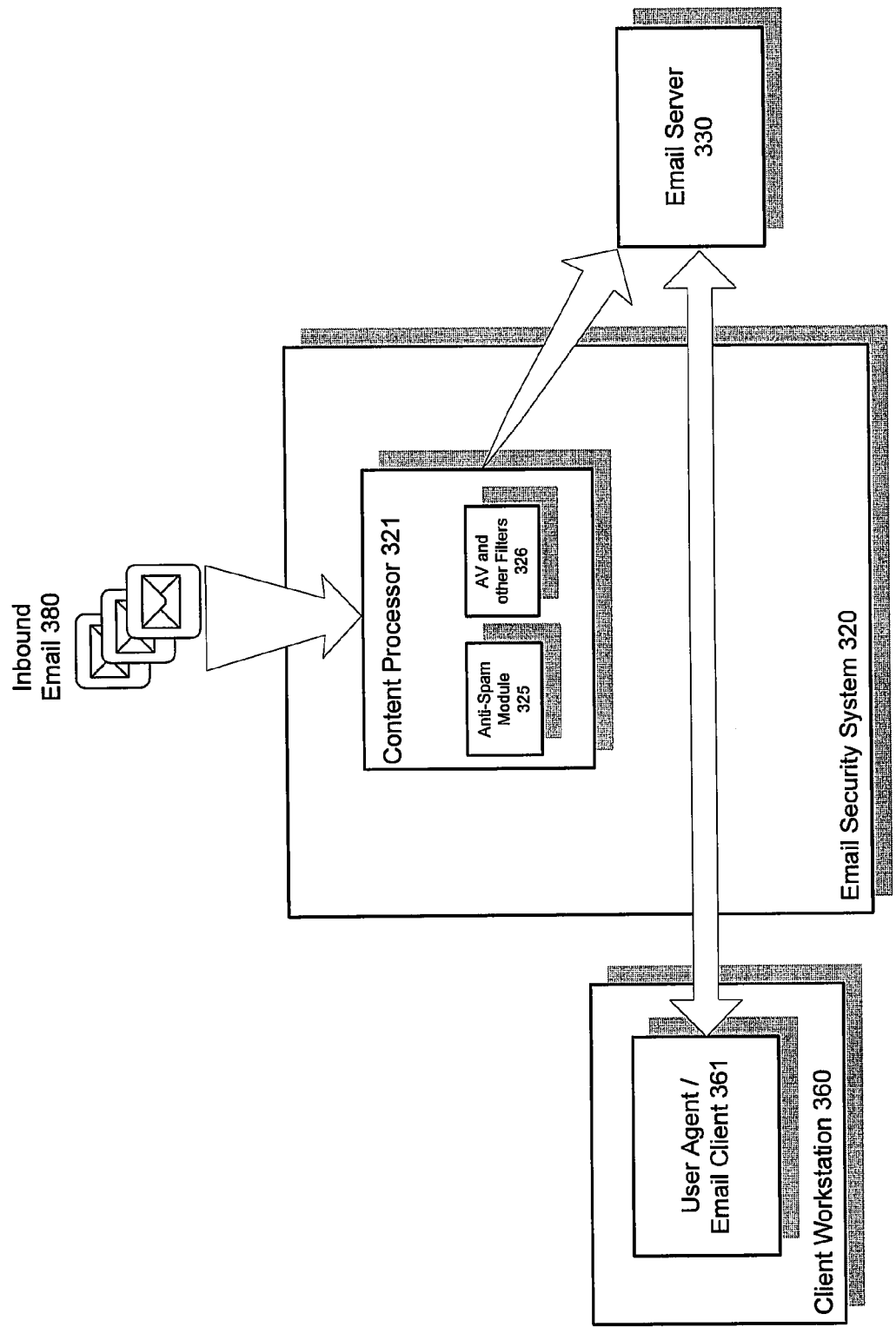
FIG. 3 is a block diagram conceptually illustrating interaction among various functional units of an email security system with a client workstation and an email server in accordance with an embodiment of the present invention.

FIG. 3 is a block diagram conceptually illustrating interaction among various functional units of an email security system 320 with a client workstation 360 and an email server 330 in accordance with an embodiment of the present invention.

While in this simplified example, only a single client workstation, i.e., client workstation 360, and a single email server, i.e., email server 330, are shown interacting with the email security system 320, it should be understood that many local and/or remote client workstations, servers and email servers may interact directly or indirectly with the email security system 320 and directly or indirectly with each other.

According to the present example, the email security system 320, which may be implemented as one or more virtual or physical devices, includes a content processor 321, logically interposed between sources of inbound email 380 and an enterprise's email server 330. In the context of the present example, the content processor 321 performs scanning of inbound email messages 380 originating from sources on the public Internet 200 before allowing such inbound email messages 380 to be stored on the email server 330. In one embodiment, an anti-spam module 325 of the content processor 321 may perform spam filtering and an anti-virus (AV) module 326 implementing AV and other filters potentially performs other traditional anti-virus detection and content filtering on data associated with the email messages.

In the current example, anti-spam module 325 may apply various image analysis methodologies described further below to ascertain email senders' intentions and therefore the likelihood that attached and/or embedded images represent image spam. According to the current example, the anti-spam module 325, responsive to being presented with an inbound email message, determines whether the email message contains embedded or attached images and if so, as described further below with reference to FIG. 5 and FIG. 6, determines if such images represent image spam.

In one embodiment, the content processor 321 is an integrated FortiASIC™ Content Processor chip developed by Fortinet, Inc. of Sunnyvale, Calif. In alternative embodiments, the content processor 321 may be a dedicated coprocessor or software to help offload content filtering tasks from a host processor (not shown).

In alternative embodiments, the anti-spam module 325 may be associated with or otherwise responsive to a mail transfer protocol proxy (not shown). The mail transfer protocol proxy may be implemented as a transparent proxy that implements handlers for Simple Mail Transfer Protocol (SMTP) or Extended SMTP (ESMTP) commands/replies relevant to the performance of content filtering activities and passes through those not relevant to the performance of content filtering activities. In one embodiment, the mail transfer protocol proxy may subject each of incoming email, outgoing email and internal email to scanning by the anti-spam module 325 and/or the content processor 321.

Notably, filtering of email need not be performed prior to storage of email message on the email server 330. In alternative embodiments, the content processor 321, the mail transfer protocol proxy (not shown) or some other functional unit logically interposed between a user agent or email client 361 executing on the client workstation 360 and the email server 330 may process email messages at the time they are requested to be transferred from the user agent/email client 361 to the email server 330 or vice versa. Meanwhile, neither the email messages nor their attachments need be stored locally on the email security system 320 to support the filtering functionality described herein. For example, instead of the anti-spam processing running responsive to a mail transfer protocol proxy, the email security system 320 may open a direct connection between the email client 361 and the email server 330, and filter email in real-time as it passes through.

While in the context of the present example, the content processor 321, the anti-spam module 325 and the mail transfer protocol proxy (not shown) have been described as residing within or as part of the same network device, in alternative embodiments one or more of these functional units may be located remotely from the other functional units. According to one embodiment, the hardware components and/or software modules that implement the content processor 321 the anti-spam module 325 and the mail transfer protocol proxy are generally provided on or distributed among one or more Internet and/or LAN accessible networked devices, such as one or more network gateways, firewalls, network security appliances, email security systems, switches, bridges, routers, data storage devices, computer systems and the like.

In one embodiment, the functionality of one or more of the above-referenced functional units may be merged in various combinations. For example, the content processor 321 may be incorporated within the mail transfer protocol proxy or the anti-spam module 325 may be incorporated within the email server 330 or the email client 361. Moreover, the functional units can be communicatively coupled using any suitable communication method (e.g., message passing, parameter passing, and/or signals through one or more communication paths etc.). Additionally, the functional units can be physically connected according to any suitable interconnection architecture (e.g., fully connected, hypercube, etc.).

According to embodiments of the invention, the functional units can be any suitable type of logic (e.g., digital logic) for executing the operations described herein. Any of the functional units used in conjunction with embodiments of the invention can include non-transitory machine-readable storage media including instructions for performing operations described herein. Non-transitory machine-readable storage media include any mechanism that provides (i.e., stores and/or transmits) information in a form readable by a machine (e.g., a computer). For example, a non-transitory machine-readable storage medium includes read only memory (ROM), random access memory (RAM), magnetic disk storage media, optical storage media, flash memory devices, etc.

Figure 4:
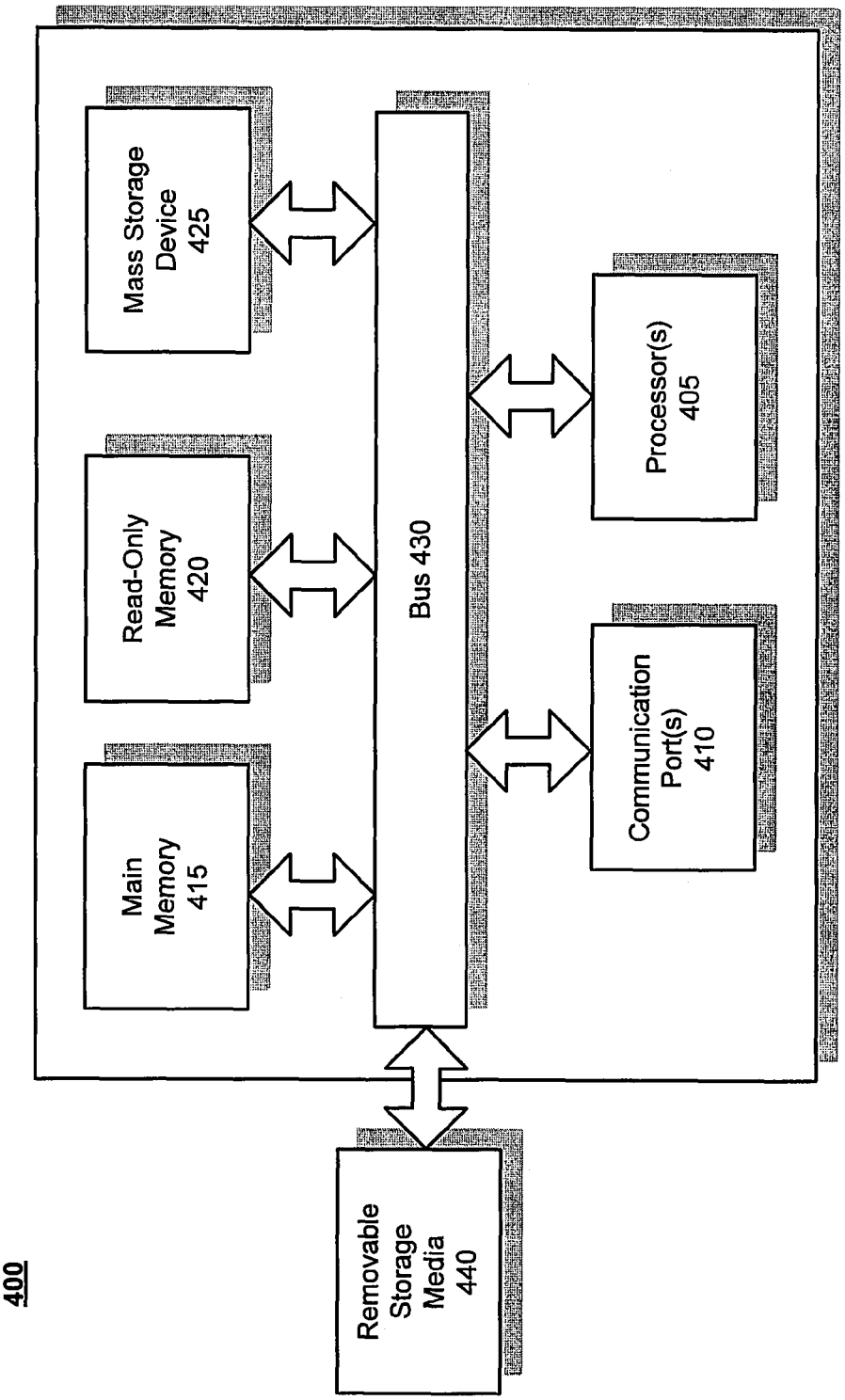
FIG. 4 is an example of a computer system with which embodiments of the present invention may be utilized.

FIG. 4 is an example of a computer system with which embodiments of the present invention may be utilized. The computer system 300 may represent or form a part of an email security system, network gateway, firewall, network appliance, switch, bridge, router, data storage devices, server, client workstation and/or other network device implementing one or more of the content processor 321 or other functional units depicted in FIG. 3. According to FIG. 4, the computer system 400 includes one or more processors 405, one or more communication ports 410, main memory 415, read only memory 420, mass storage 425, a bus 430, and removable storage media 440.

The processor(s) 405 may be Intel® Itanium® or Itanium 2® processor(s), AMD® Opteron® or Athlon MP® processor(s) or other processors known in the art.

Communication port(s) 410 represent physical and/or logical ports. For example communication port(s) may be any of an RS-232 port for use with a modem based dialup connection, a 10/100 Ethernet port, or a Gigabit port using copper or fiber. Communication port(s) 410 may be chosen depending on a network such a Local Area Network (LAN), Wide Area Network (WAN), or any network to which the computer system 400 connects.

Communication port(s) 410 may also be the name of the end of a logical connection (e.g., a Transmission Control Protocol (TCP) port or a User Datagram Protocol (UDP) port). For example communication ports may be one of the Well Know Ports, such as TCP port 25 or UDP port 25 (used for Simple Mail Transfer), assigned by the Internet Assigned Numbers Authority (IANA) for specific uses.

Main memory 415 may be Random Access Memory (RAM), or any other dynamic storage device(s) commonly known in the art.

Read only memory 420 may be any static storage device(s) such as Programmable Read Only Memory (PROM) chips for storing static information such as instructions for processors 405.

Mass storage 425 may be used to store information and instructions. For example, hard disks such as the Adaptec® family of SCSI drives, an optical disc, an array of disks such as RAID, such as the Adaptec family of RAID drives, or any other mass storage devices may be used.

Bus 430 communicatively couples processor(s) 405 with the other memory, storage and communication blocks. Bus 430 may be a PCI/PCI-X or SCSI based system bus depending on the storage devices used.

Optional removable storage media 440 may be any kind of external hard-drives, floppy drives, IOMEGA® Zip Drives, Compact Disc-Read Only Memory (CD-ROM), Compact Disc-Re-Writable (CD-RW), Digital Video Disk (DVD)-Read Only Memory (DVD-ROM), Re-Writable DVD and the like.

Figure 5:
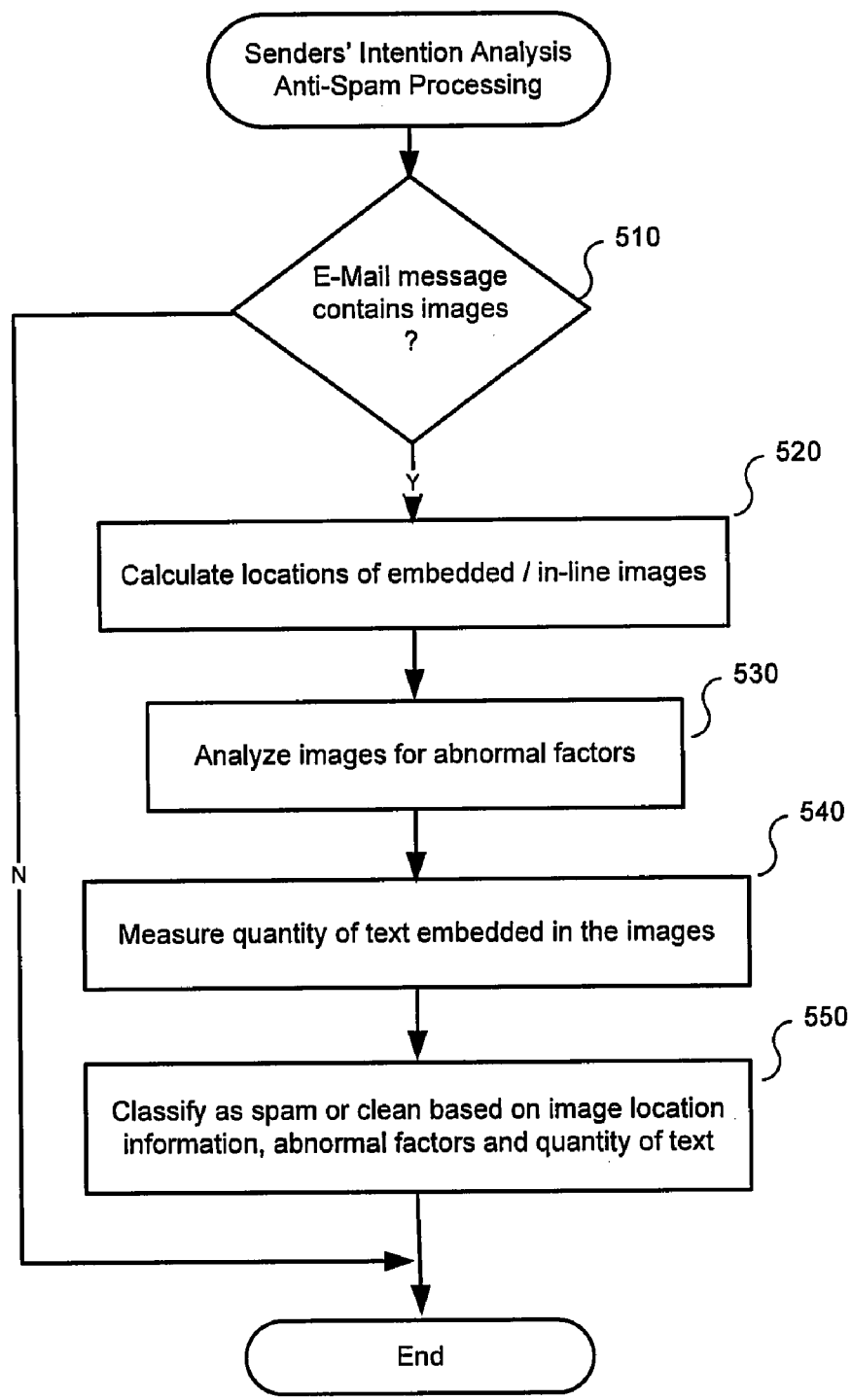
FIG. 5 is a high-level flow diagram illustrating anti-spam processing of images using sender's intention analysis in accordance with an embodiment of the present invention.

FIG. 5 is a high-level flow diagram illustrating anti-spam processing of images using sender's intention analysis in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 510, an email message is analyzed to determine if it contains images. For purposes of the present example, the direction of flow of the email message is not pertinent. As indicated above, the email message may be inbound, outbound or an intra-enterprise email message. In various embodiments, however, the anti-spam processing may be enabled in one direction only or various detection thresholds could be configured differently for different flows.

In any event, in one embodiment, the headers, body and attachments, if any, of the email message at issue are parsed and scanned to identify whether the email message is deemed to contain one or more embedded images. If so, processing continues with block 520. Otherwise, no further image spam analysis is required and processing branches to the end.

At block 520, the email message at issue has been determined to contain one or more embedded images. In the current example, the senders' intention analysis anti-spam processing, therefore, proceeds to calculate the location(s) of the embedded image(s). Images may be embedded in a HyperText Markup Language (HTML) part of an HTML formatted email message, within a MIME document or attached separately. In one embodiment, by parsing the HTML, plain text and/or other Multipurpose Internet Mail Extension (MIME) parts, the displaying line just prior to the images can be identified and thus the approximate displaying location of any embedded images can be calculated.

At block 530, the one or more images are analyzed for indications of one or more abnormal factors. Typically, the abnormal factors are manifestations of a spammer's attempt to obscure text embedded within the one or more images by injecting a variety of noise. In one embodiment, abnormal factors include the presence of one or more of the following characteristics (i) illegal base64 encoding; (ii) multiple images within one HTML part; (iii) one or more low entropy frames in an animated Graphic Interchange Format (GIF); (iv) illegal chunk data within a Portable Network Graphics (PNG) file; (v) quantities of unsmoothed curves; and (iv) quantities of unsmoothed color blocks.

In one embodiment, illegal base64 encoding can be detected by, among other things, observing illegal characters, such as '!' in the encoded content, such as the HTML formatted message or any part of the MIME document.

In one embodiment, the inclusion of multiple images within one HTML part can be detected by parsing the HTML formatted email message and observing more than one image within an HTML part. In the exemplary HTML code excerpt below, the existence of three images within a single table row (<tr>...</tr>) reveals an intention on the part of the creator of the email message to display a contiguous image to the email recipient based on the three separate embedded images.

```
<html>
<head>
<meta content="text/html;charset=ISO-8859-1" http-equiv="Content-Type">
<title></title>
</head>
<body bgcolor="#ffffff" text="#000000">
<title>abovementioned bertie</title>
<div align="center">
[...]
    <tr>
        <td width="33%"> <a
href="http://www.lklljjp.biz/vpr6160/"> <img name="apprehension"
src="cid:part2.00020108.07020409@72.ca" border="0" height="179"
width="184"></a></td>
<td width="33%"> <a
href="http://www.lklljjp.biz/vpr6160/"> <img name="gradate"
src="cid:part3.00060308.03010709@72.ca" border="0" height="179"
width="184"></a></td>
<td width="34%"> <a
href="http://www.lklljjp.biz/vpr6160/"> <img name="maltreat"
src="cid:part4.02080304.00040002@72.ca" border="0" height="179"
width="184"></a></td>
    </tr>
[...]
</body>
</html>
```

The existence of one or more low entropy frames of an animated GIF may be determined on an absolute and/or relative basis. For example, an animated GIF frame may be determined to be low with reference to observed entropy values of normal GIF files, which vary from approximately 0.1 to 5.0. Therefore, in one embodiment, the existence of one or more low entropy frames is confirmed based on a comparison of the entropy values calculated for the animated GIF at issue to 0.1. If the entropy value calculated for any frame of the animated GIF at issue is less than 0.1, then this abnormal factor is deemed to exist. In other embodiments, one or more frames of the animated GIF file at issue may simply be "low" entropy relative to the other high entropy frames. For example, a variation of more than 4.9 between the highest entropy frame and the lowest entropy frame relatively lower than the others within the animated GIF file at issue.

Illegal chunk data within a Portable Network Graphics (PNG) file may be observed by evaluating information contained within and/or about the chunks. For example, the length of the chunk and cyclic redundancy checksum (CRC) may be verified against the actual data length and recomputed CRC.

Quantities of unsmoothed curves may be detected by evaluating the amount of pixels in which the difference between their color and the average color of the surrounding pixels are greater than a threshold.

Quantities of unsmoothed color blocks may be detected by evaluating the amount of the color blocks in which the difference between their color and the color of the surrounding color blocks are greater than a threshold. Color blocks contain pixels with the same or similar colors.

In one embodiment, rather than simply conveying a binary result (e.g., a zero indicating the absence of the abnormal factor at issue and a one indicating the presence of the abnormal factor at issue), a value within a range (e.g., 0 to 10) may be returned indicating the degree to which the abnormal factor is expressed.

At block 540, the quantity of text embedded in the images is measured. In one embodiment, images are converted to a binary representation based on a thresholding technique described in further detail below. In general, thresholding is a simple method of image segmentation. Individual pixels in a grayscale image are marked as "information" pixels if their value is greater than some threshold value, T, (assuming the information content is brighter than the background) and as "background" pixels otherwise. Typically, an information pixel is given a value of "1" while a background pixel is given a value of "0." Then, a text string measurement algorithm is applied to the binary representation of the portion of the image deemed to contain the information content.

Notably, in one embodiment, rather than considering the quantity of embedded text alone, both the quantity of text and the relative position of such text within an email viewer's preview window, for example, or within the image itself may be taken into consideration. For example, a high spam score could be assigned to a very large image (with a correspondingly smaller percentage of text), but the text is positioned to occupy the whole preview window.

At block 550, the email message is classified as spam or clean based on the observed characteristics of the embedded image(s), such as image location information, the existence/non-existence of various abnormal factors and the quantity of text determined to exist within the embedded image(s). In one embodiment, the spam/clean classification may be based upon a weighted average of the various observed characteristics.

In one embodiment, each observed characteristic may contribute to the score. Once the score reaches a threshold, the email message may be classified as spam and the further characteristics may not require analysis or observation. The email message is classified as clean if the score is less than the threshold after all the characteristics have been evaluated. In one embodiment, the characteristics may be considered in the following order:

Image location information
Presence of continuous images
Presence of illegal base64 encoding
Presence of lower entropy frames in an animated GIF
Presence of illegal chunk data of a PNG encoded image
Quantities and/or location of text in the images
Quantities of unsmoothed curves in the images
Quantities of unsmoothed color blocks in the images In one embodiment, similar to that described above with reference to abnormal factors, rather than making the ultimate spam/clean decision (because the ultimate decision could be made by another component), a "spaminess" score may be generated. For example, rather than simply conveying a binary result (e.g., spam vs. clean), a value within a range (e.g., 0 to 10) may be returned indicating the degree to which the email message appeared to contain indications of being spam or the likelihood the email message is spam.

If upon completion of the anti-spam processing described above there is not sufficient data to determine the email message is spam (e.g., there is insufficient data to determine the sender's intention), then according to one embodiment, more CPU intensive processes, such as OCR, may be invoked. Advantageously, in this manner, most image spam emails can be detected in real-time without compromising performance and more CPU intensive processes are only performed if and when required.

Figure 6:
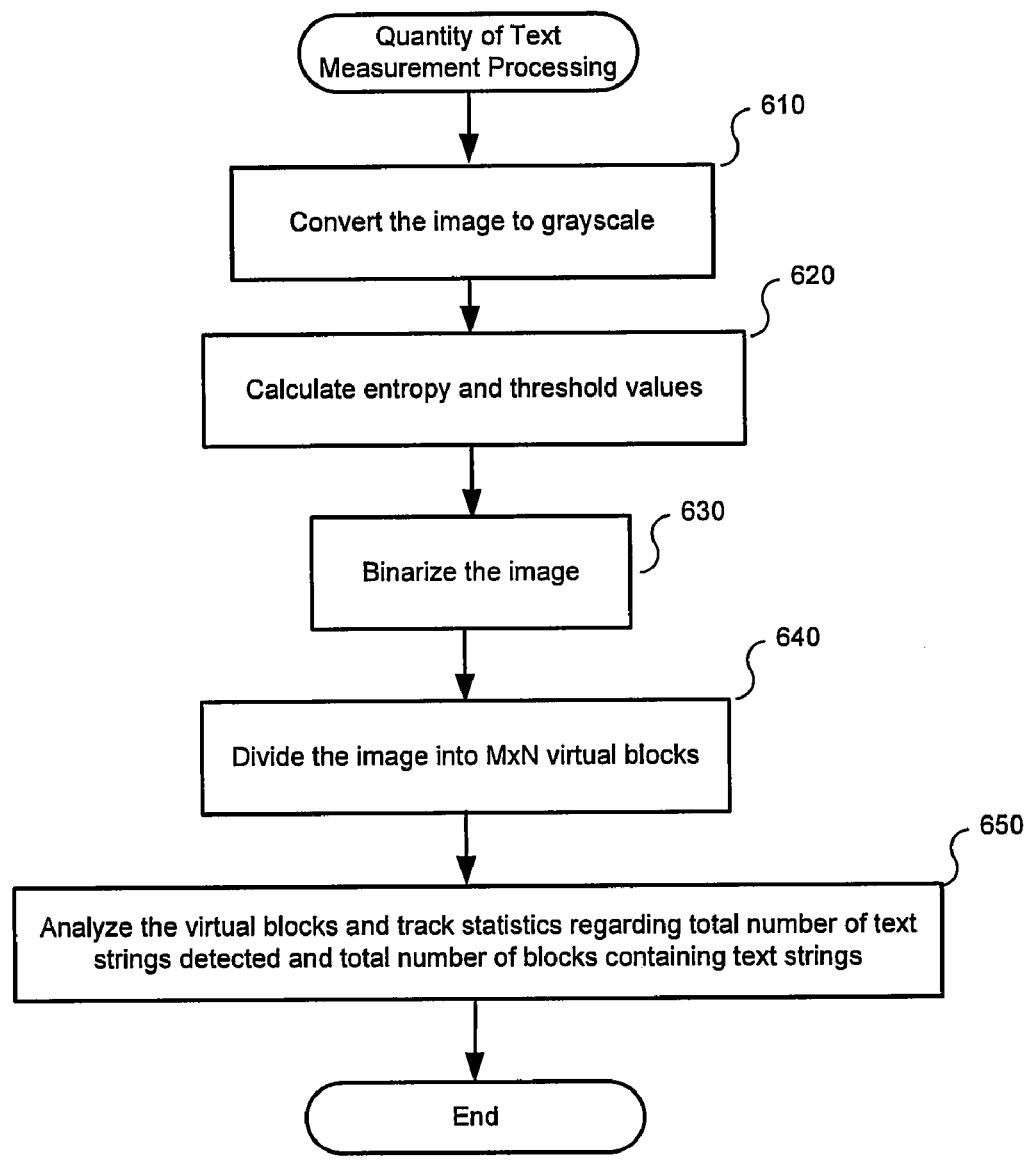
FIG. 6 is a flow diagram illustrating quantity of text measurement processing in accordance with an embodiment of the present invention.

FIG. 6 is a flow diagram illustrating quantity of text measurement processing in accordance with an embodiment of the present invention. The steps described below represent the processing of block 540 of FIG. 5 according to one embodiment of the present invention.

As mentioned with reference to FIG. 5, depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 610, if the image at issue is color, then it is converted to grayscale to form a grayscale representation, $G_{i,j}$. According to one embodiment, color pixels of the image at issue are converted to grayscale by computing an average or weighted average of the red, green and blue color components. While various conversions may be used, examples of suitable conversion equations include the following:

$$G_{i,j} = (0.299 * r_{i,j} + 0.587 * g_{i,j} + 0.114 * b_{i,j})/3 \quad 0 \leq i < x_{max}, \quad 0 \leq j < y_{max}$$ EQ #1

$$G_{i,j} = (0.3 * r_{i,j} + 0.6 * g_{i,j} + 0.1 * b_{i,j})/3 \quad 0 \leq i < x_{max}, 0 \leq j < y_{max}$$ EQ #2

$$G_{i,j} = (r_{i,j} + g_{i,j} + b_{i,j})/3 \quad 0 \leq i < x_{max}, 0 \leq j < y_{max}$$ EQ #3

At block 620, entropy and threshold values are determined for the grayscale image, $G_{i,j}$. Entropy is a statistical measure of randomness that can be used to characterize the texture of the input image. In connection with calculating the entropy of the grayscale image, an intermediate data structure is built containing an intensity histogram, $C^g$. In the context of an 8-bit grayscale image, each pixel may have a value of 0 to 255. Thus, the intensity histogram includes 256 bins each of which maintain a count of the number of pixels in the grayscale image having that value. An example of an intensity histogram is shown in FIG. 9, which represents an intensity histogram for a grayscale representation of FIG. 8. In one embodiment entropy is calculated according to:

$$E = -\sum_{g=0}^{255} \left( \frac{C^g}{\sum C^g} * \log\left(\frac{C^g}{\sum C^g}\right) \right)$$ EQ #4

Subject to:

$$C^g = \sum_{i=0}^{x_{max}} \sum_{j=0}^{y_{max}} c_{i,j}^g$$ EQ #5

$$c_{i,j}^g = \begin{cases} 1 & G_{i,j} = g \\ 0 & \text{otherwise} \end{cases}, 0 \leq i < x_{max}, 0 \leq j < y_{max}$$ EQ #6

According to one embodiment, a threshold value within the intensity histogram is selected simply by choosing the mean or median value. The rationale for this simple threshold selection is that if the information pixels are brighter than the background, they should also be brighter than the average. However, to compensate for the existence of noise and variability in the background, a more sophisticated approach is to create a histogram of the image pixel intensities and then use the valley point as the threshold, T. This histogram approach assumes that there is some average value for the background and information pixels, but that the actual pixel values have some variation around these average values. In one embodiment, the threshold, T, is calculated by:

$$T = \text{Max}(\delta_i) \quad 0 \leq i \leq 255$$ EQ #7

Subject to:

$$\delta_i = w_{i1} w_{i2} (M_{i1} - M_{i2})^2 \quad 0 \leq i < 255$$ EQ #8

$$w_{i1} = \sum_{g=0}^{i} C^g$$ EQ #9

$$w_{i2} = \sum_{g=i+1}^{255} C^g$$ EQ #10

$$M_{i1} = \frac{\sum_{g=0}^{i} g * C^g}{\sum_{g=0}^{i} C^g}$$ EQ #11

$$M_{i2} = \frac{\sum_{g=i+1}^{255} k * C^g}{\sum_{g=i+1}^{255} C^g}$$ EQ #12

According to the above example, the gray levels are divided into two groups by i, and $w_{i1}$ and $w_{i2}$ are the total amount of the pixels of each group while $M_{i1}$ and $M_{i2}$ are the average of the gray level of each group.

Notably, there are many existing methods of performing thresholding. Consequently, any other current or future method of performing thresholding may be used depending upon the needs of a particular implementation.

At block 630, thresholding is performed to form a binary representation, $B_{i,j}$, of the grayscale image based on the threshold value selected in block 620. In one embodiment, thresholding is performed in accordance with the following equations:

$$B_{i,j} = \begin{cases} 0 & G_{i,j} < T \\ 1 & \text{Otherwise} \end{cases} \quad 0 \leq i < x_{max}, 0 \leq j < y_{max}$$ EQ #13

$$B'_{i,j} = \begin{cases} B_{i,j} & \max(C^k) < \partial, \max(C^k) < T \\ !B_{i,j} & \text{Otherwise} \end{cases} \quad 0 \leq k \leq 255$$ EQ #14 where, $\partial$ is an adjustable parameter.

At block 640, the binary image is logically divided into M×N virtual blocks.

At block 650, the M×N virtual blocks are analyzed to quantify the number of text strings. In one embodiment, the text strings in the binary image are quantified in accordance with the following equations:

$$T = \sum_{m=0}^{M} \sum_{n=0}^{N} T^{m,n}$$ EQ #15

Subject to:

-continued $$T^{m,n} = \sum_{y_t=y_0^m}^{y_{max}^m} \sum_{y_b=y_t+1}^{y_{max}^m} T_{y_t,y_b}^{m,n} \quad \text{EQ \#16}$$

$$y_0^m = \frac{y_{max}}{\partial_0}(m-1), \; y_{max}^m = y_0^m + \partial_0$$

$$T_{y_t,y_b}^{m,n} = \begin{cases} 1 & \partial_1 > \sum_{i=y_t}^{y_b} CB_i^n > \partial_2 \\ & \sum_{k=x_0^n}^{x_{max}^n} B_{k,y_b+1} < \partial_3, \; x_0^n = \frac{x_{max}}{\partial_0}(n-1), \; x_{max}^n = x_0^n + \partial_0 \\ 0 & \text{Otherwise} \end{cases} \quad \text{EQ \#17}$$

$$CB_i^n = \begin{cases} 1 & \partial_4 > \sum_{k=x_0^n}^{x_{max}^n} B_{k,i} > \partial_5 \\ & \text{Max}\left(\sum_{k=x_w}^{x_w+\partial_6} B_{k,i}\right) < \partial_7, \; x_0^n \le x_w \le x_{max}^n \\ 0 & \text{Otherwise} \end{cases} \quad \text{EQ \#18}$$

where, $\partial_0 \ldots \partial_7$ are adjustable parameters;
$T_{y_t,y_b}^{m,n}$ is the likelihood that the row between $y_t$ and $y_b$ in the block [m,n] represents text;
$CB_i^n$ is the likelihood that the line[i] is a part of text;
$B_{k,i}$ is the value of pixel[k,i] in the binary image.

Notably, while in the context of the equations presented above, a global thresholding approach is implemented taking into consideration the image as a whole, in alternative embodiments, various forms of local thresholding may be performed that consider groups of blocks or individual blocks to determine the best thresholding approach for such block or blocks.

CONCRETE EXAMPLES

For sake of illustration, two concrete examples of application of the thresholding and text quantification described above will now be provided with reference to FIG. 7 to FIG. 13.

Figure 7:
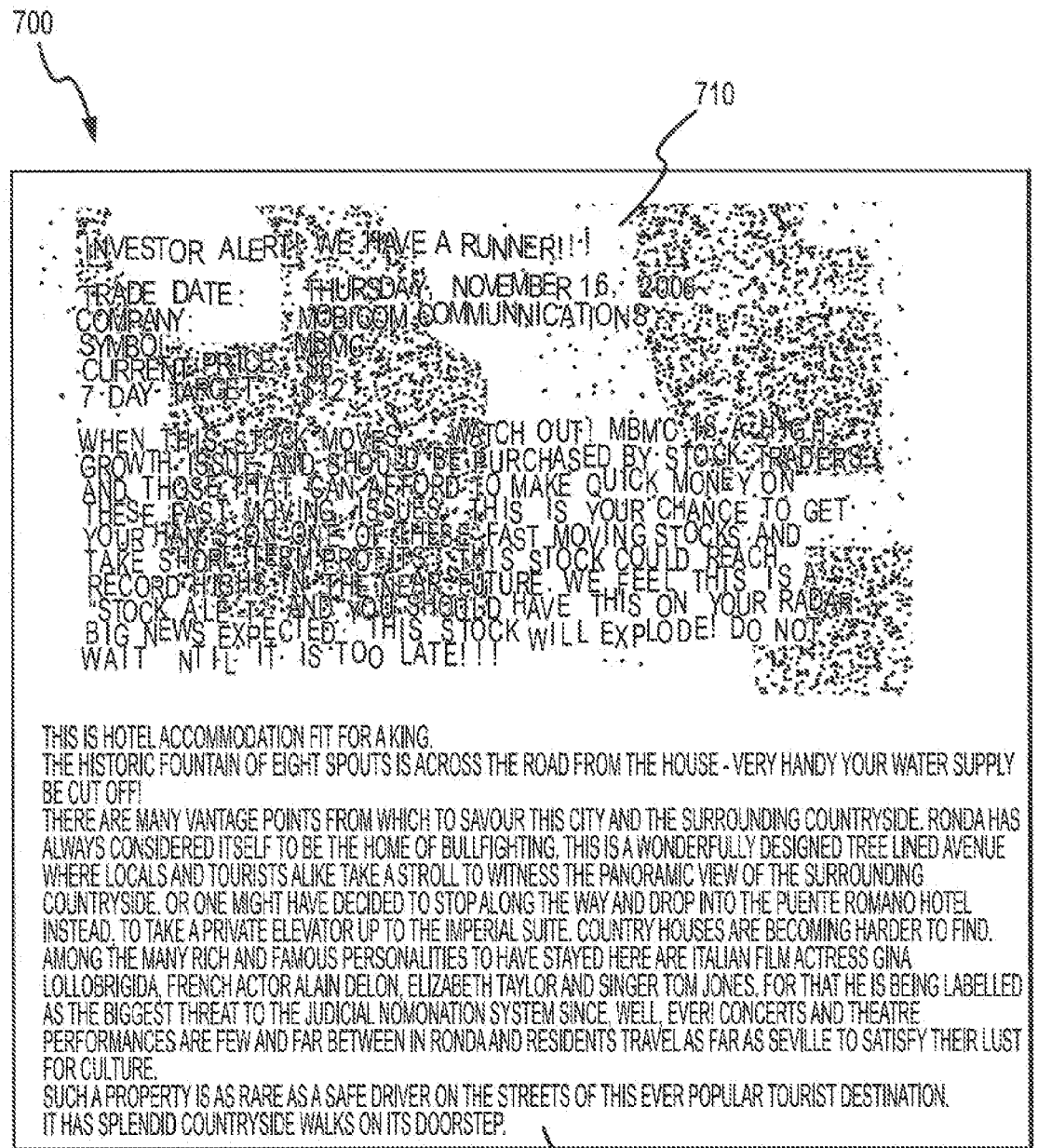
FIG. 7 is an example of an image spam email message containing an embedded image.

FIG. 7 is an example of an image spam email message 700 containing an embedded image 710. Typically, such image spam email messages also include text 720 in an attempt to defeat conventional heuristic filters.

Figure 8:
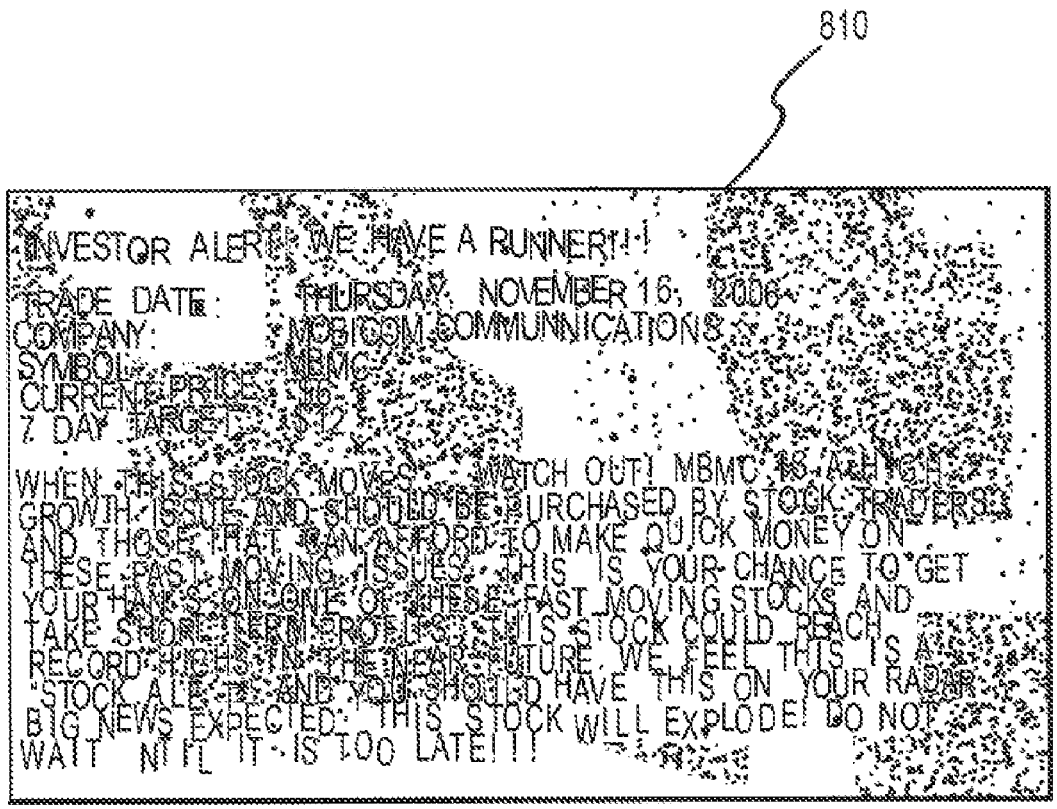
FIG. 8 is a grayscale image based on the embedded image of FIG. 7 according to one embodiment of the present invention.
Figure 9:
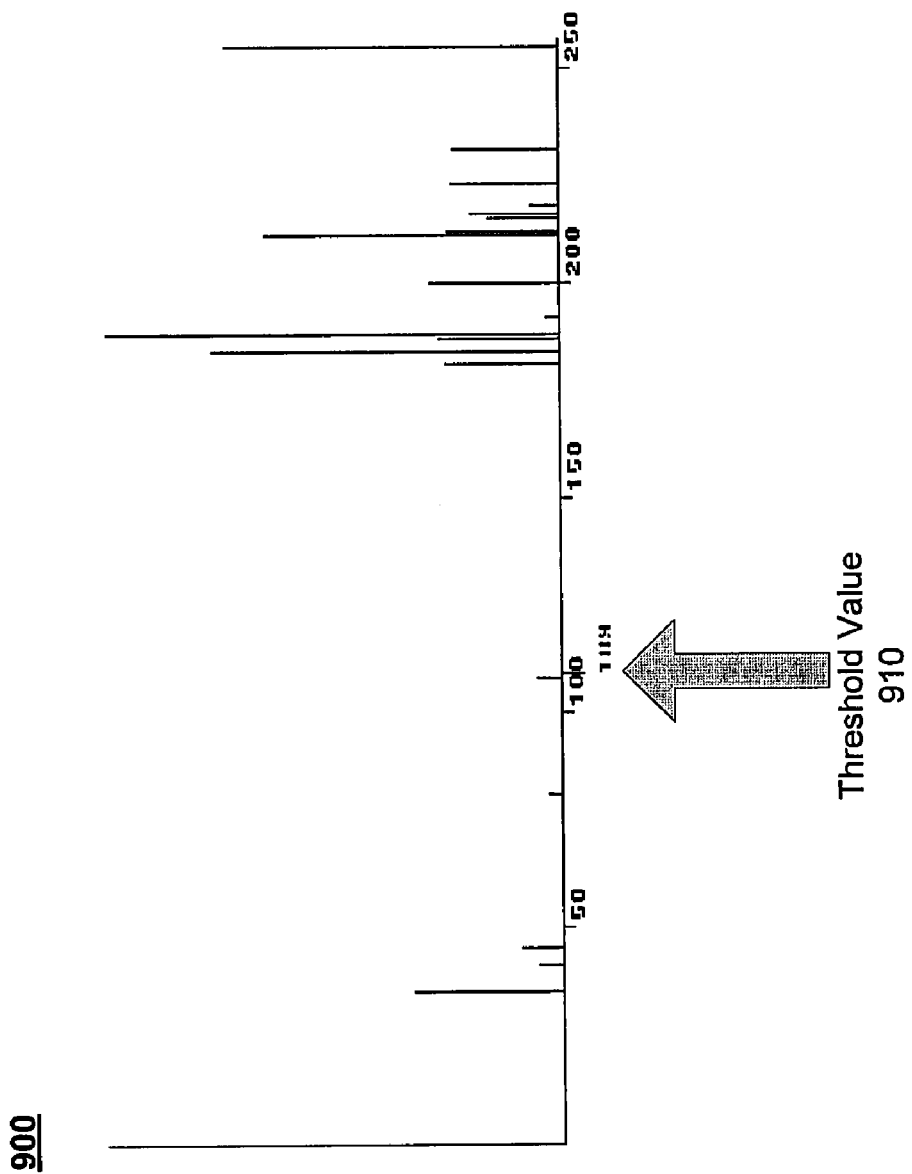
FIG. 9 is an intensity histogram for the grayscale image of FIG. 8 according to one embodiment of the present invention.

FIG. 8 is a grayscale image 810 based on the embedded image 710 of FIG. 7 according to one embodiment of the present invention. According to the flow diagram of FIG. 6, the first step (block 610) is to convert the embedded image 710 to a grayscale representation, $G_{i,j}$. Assuming embedded image 710 of FIG. 7 is a color image having red (r), green (g) and blue (b) color components, after application of one of equations EQ #1, EQ #2, EQ #3 or the like, the grayscale representation, $G_{i,j}$, appears as grayscale image 810.

FIG. 9 is an intensity histogram 900 for the grayscale image 810 of FIG. 8 according to one embodiment of the present invention. According to the flow diagram of FIG. 6, the next step (block 620) is to build an intensity histogram data structure, $C^g$, and determine a threshold value for the grayscale image 810. After application of one or more of equations EQ #4, EQ #5, EQ #6, EQ #7, EQ #8, EQ #9, EQ #10, EQ #11, EQ #12 or the like to the grayscale representation, $G_{i,j}$, (grayscale image 810), an intensity histogram data structure, $C^g$, results, which appears as intensity histogram 900 when displayed in graphical form. Assuming 256 possible gray levels are represented in grayscale image 810, the intensity histogram 900 graphically illustrates the number of pixel occurrences in grayscale image 810 for each gray level.

Application of the above-referenced equations also results in a threshold value, T, 910, being calculated for grayscale image 810. According to this example, the threshold value 910 is 109.

FIG. 10 is a binary image 1010 resulting from thresholding the grayscale image 810 of FIG. 8 in accordance with an embodiment of the present invention. According to the flow diagram of FIG. 6, the next step (block 630) is to binarize the image by performing thresholding with the calculated threshold value. Application of one or both of equations EQ #13 and EQ #14 or the like, causes the binary representation, $B_{i,j}$, to contain a zero for each pixel in which the grayscale representation $G_{i,j}$, is less than the calculated threshold value, T, and to contain a one for each pixel in which the grayscale representation $G_{i,j}$, is greater than or equal to the calculated threshold value, T. For purposes of illustration, the result of graphically depicting the binary representation, $B_{i,j}$, in which pixels having a value of one are presented as black and pixels having a value of zero are presented as white image is shown as binary image 1010. As can be seen with reference to FIG. 10, the information content intended to be conveyed, i.e., the various text strings, to the email recipient is now clearly distinguishable from the background.

FIG. 11 illustrates an exemplary segmentation of the binary image of FIG. 10 into 28 virtual blocks and highlights the text strings detected within the blocks in accordance with an embodiment of the present invention. According to the flow diagram of FIG. 6, the next steps (blocks 640 and 650) are to logically divide the binary image 1010 into virtual blocks and then separately analyze each block to measure perceived text content. Application of one or more of equations EQ #15, EQ #16, EQ #17, EQ #18 or the like, causes the text string count, T, to contain the sum of all blocks determined to contain a text string.

In the present example, segmented binary image 1110 contains 28 virtual blocks, examples of which are pointed out with reference numerals 1120 and 1130. According to equations EQ #15, EQ #16, EQ #17 and EQ #18, 23 of the 28 blocks contain a total of 63 text strings. Text strings detected by the algorithm are underlined. Block 1120 is an example of a block that has been determined to contain one or more text strings, i.e., the word "TRADE" 1121. Block 1130 is an example of a block that has been determined not to contain a text string.

Figure 12:
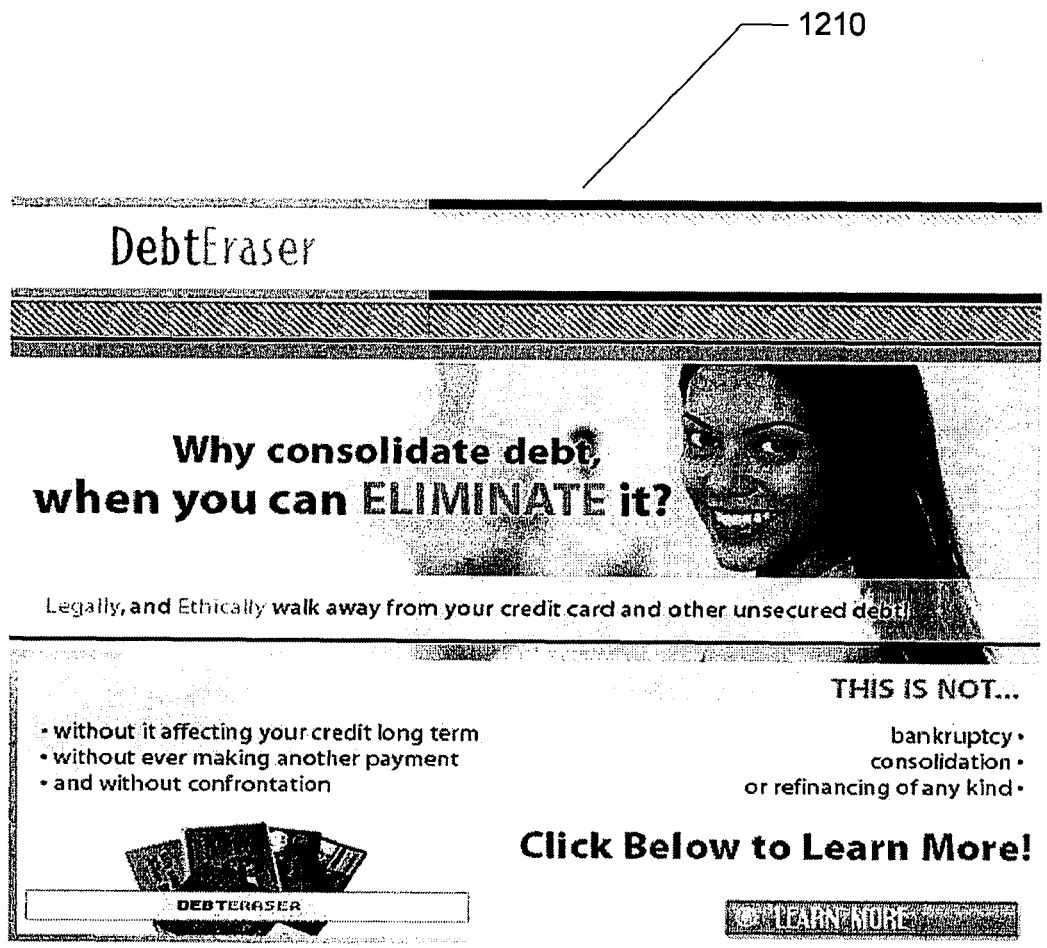
FIG. 12 is a grayscale image based on another exemplary embedded image observed in connection with image spam.

FIG. 12 is a grayscale image 1210 based on another exemplary embedded image observed in connection with image spam.

Figure 13:
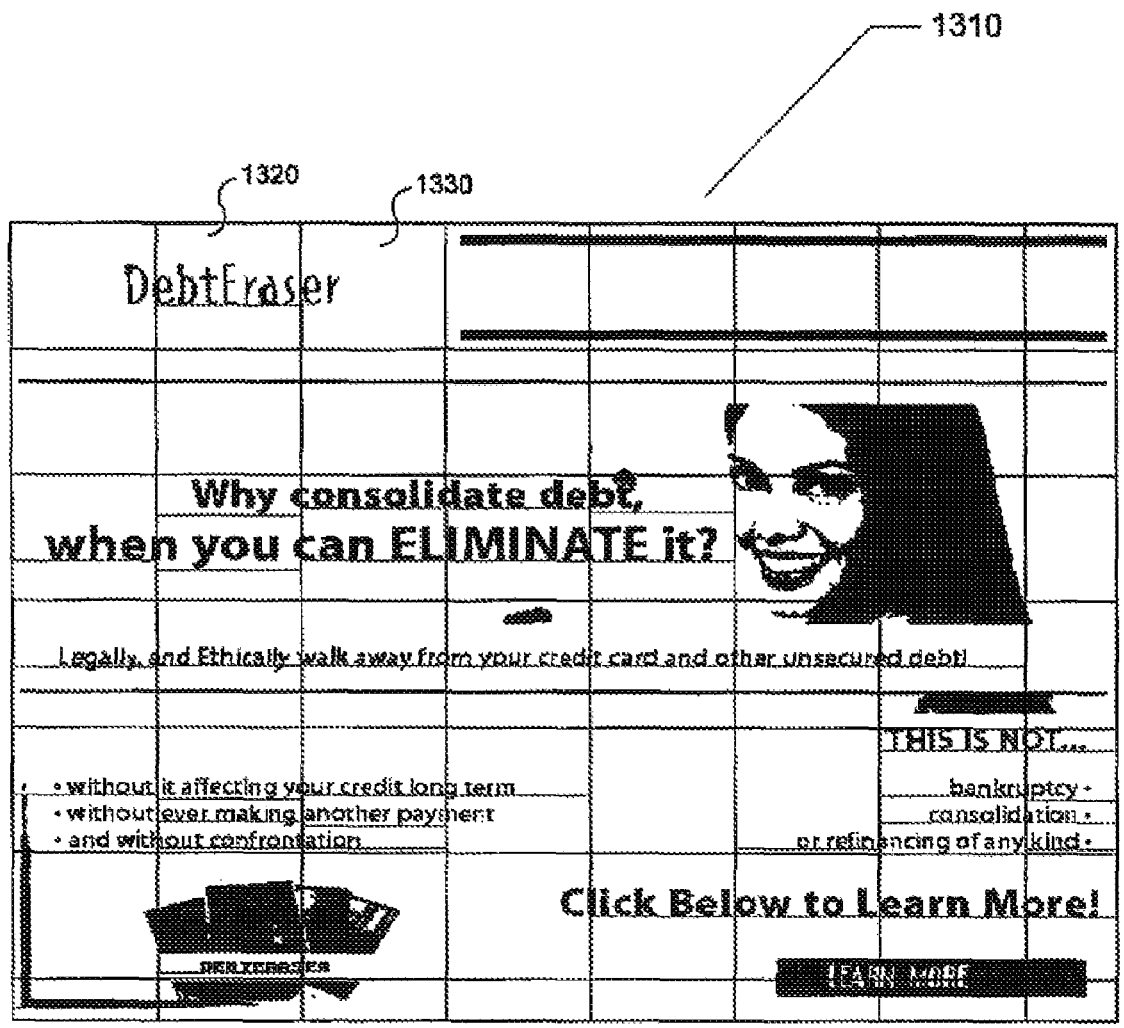
FIG. 13 illustrates an exemplary segmentation into 56 virtual blocks a binarized image corresponding to the image of FIG. 12 and highlights the text strings detected within the blocks in accordance with an embodiment of the present invention.

FIG. 13 illustrates an exemplary segmentation into 56 virtual blocks a binarized image 1310 corresponding to the grayscale image 1210 of FIG. 12 and highlights the text strings detected within the blocks in accordance with an embodiment of the present invention. In the present example, segmented binary image 1310 contains 56 virtual blocks, examples of which are pointed out with reference numerals 1320 and 1330. According to equations EQ #15, EQ #16, EQ #17 and EQ #18, 26 of the 56 blocks contain a total of 40 text strings. Text strings detected by the algorithm are underlined. Block 1320 is an example of a block that has been determined to contain one or more text strings, i.e., the group of letters "ebtEras". Block 1330 is an example of a block that has been determined not to contain a text string.

Notably, to the extent reverse video or the presentation of light colored (e.g., white) text in the context of a dark (e.g., black) background becomes problematic (see, e.g., the "LEARN MORE" text string embedded within FIG. 13), one approach to detect such text strings would be to apply a local thresholding approach using EQ #14, which would effectively reverse the black and white pixels for the blocks at issue.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A computer-implemented method comprising:
   converting, by an anti-spam module, an embedded image of an electronic mail (email) message to a binarized representation by performing thresholding on a grayscale representation of the embedded image;
   quantifying, by the anti-spam module, a number of text strings that are included in the embedded image by analyzing one or more blocks of the binarized representation with a text string measurement algorithm;
   classifying, by the anti-spam module, the email message as spam or clean based at least in part on the number of text strings;
   wherein the anti-spam module is implemented in one or more processors and one or more non-transitory computer-readable storage media of one or more computer systems, the one or more non-transitory computer-readable storage media having instructions tangibly embodied therein representing the anti-spam module that are executable by the one or more processors; and
   wherein the one or more blocks comprise M×N virtual blocks and wherein the text string measurement algorithm employs equations having a general form as follows:

$$T = \sum_{m=0}^{M} \sum_{n=0}^{N} T^{m,n}$$

subject to:

$$T^{m,n} = \sum_{y_t=y_0^m}^{y_{max}^m} \sum_{y_b=y_t+1}^{y_{max}^m} T_{y_t,y_b}^{m,n}$$

$$y_0^m = \frac{y_{max}}{\partial_0}(m-1), \quad y_{max}^m = y_0^m + \partial_0$$

$$T_{y_t,y_b}^{m,n} = \begin{cases} 1 & \partial_1 > \sum_{i=y_t}^{y_b} CB_i^n > \partial_2 \\ \sum_{k=x_0^n}^{x_{max}^n} B_{k,y_b+1} < \partial_3, \quad x_0^n = \frac{x_{max}}{\partial_0}(n-1), \quad x_{max}^n = x_0^n + \partial_0 \\ 0 & \text{Otherwise} \end{cases}$$

$$CB_i^n = \begin{cases} 1 & \partial_4 > \sum_{k=x_0^n}^{x_{max}^n} B_{k,i} > \partial_5 \\ & \text{Max}\left(\sum_{k=x_w}^{x_w+\partial_6} B_{k,i}\right) < \partial_7, \quad x_0^n \leq x_w \leq x_{max}^n \\ 0 & \text{Otherwise} \end{cases}$$

where,
$\partial_0 \ldots \partial_7$ are adjustable parameters;
T is the number of text strings;
$T_{y_t,y_b}^{m,n}$ is a likelihood that a row between $y_t$ and $y_b$ in virtual block [m,n] represents text;
$CB_i^n$ is a likelihood that a line[i] is a part of text; and
$B_{k,i}$ is a value of pixel[k,i] in the binary representation.

2. The method of claim 1, wherein the embedded image is conveyed formatted in accordance with Graphic Interchange Format (GIF), Joint Photographic Experts Group (JPEG) or Portable Network Graphics (PNG).

3. The method of claim 1, wherein the embedded image comprises an image contained within a file attached to the email message.

4. The method of claim 2, further comprising determining an approximate display location of an embedded image within an electronic mail (email) message.

5. The method of claim 2, further comprising identifying existence of one or more abnormal factors associated with the embedded image.

6. A computer-implemented method comprising:
   determining, by an anti-spam module, an approximate display location of one or more embedded images within an electronic mail (email) message;
   identifying, by the anti-spam module, existence of one or more abnormal factors associated with the one or more embedded images;
   quantifying, by the anti-spam module, a number of text strings that are included in the embedded image by analyzing one or more blocks of the binarized representation with a text string measurement algorithm;
   classifying, by the anti-spam module, the email message as spam or clean based on the approximate display location, the existence of one or more abnormal factors and the number of text strings;
   wherein the anti-spam module is implemented in one or more processors and one or more non-transitory computer-readable storage media of one or more computer systems, the one or more non-transitory computer-readable storage media having instructions tangibly embodied therein representing the anti-spam module that are executable by the one or more processors; and
   wherein the one or more blocks comprise M×N virtual blocks and wherein the text string measurement algorithm employs equations having a general form as follows:

$$T = \sum_{m=0}^{M} \sum_{n=0}^{N} T^{m,n}$$

subject to:

$$T^{m,n} = \sum_{y_t=y_0^m}^{y_{max}^m} \sum_{y_b=y_t+1}^{y_{max}^m} T_{y_t,y_b}^{m,n}$$

$$y_0^m = \frac{y_{max}}{\partial_0}(m-1), \quad y_{max}^m = y_0^m + \partial_0$$

$$T_{y_t,y_b}^{m,n} = \begin{cases} 1 & \partial_1 > \sum_{i=y_t}^{y_b} CB_i^n > \partial_2 \\ \sum_{k=x_0^n}^{x_{max}^n} B_{k,y_b+1} < \partial_3, \quad x_0^n = \frac{x_{max}}{\partial_0}(n-1), \quad x_{max}^n = x_0^n + \partial_0 \\ 0 & \text{Otherwise} \end{cases}$$

$$CB_i^n = \begin{cases} 1 & \partial_4 > \sum_{k=x_0^n}^{x_{max}^n} B_{k,i} > \partial_5 \\ & \text{Max}\left(\sum_{k=x_w}^{x_w+\partial_6} B_{k,i}\right) < \partial_7, x_0^n \le x_w \le x_{max}^n \\ 0 & \text{Otherwise} \end{cases}$$

where, $\partial_0 \ldots \partial_7$ are adjustable parameters;

T is the number of text strings;

$T_{y_t,y_b}^{m,n}$ is a likelihood that a row between $y_t$ and $y_b$ in virtual block [m,n] represents text;

$CB_i^n$ is a likelihood that a line[i] is a part of text; and $B_{k,i}$ is a value of pixel[k,i] in the binary representation.

7. The method of claim 6, further comprising performing image thresholding on grayscale representations of the one or more embedded images.

8. The method of claim 6, wherein the email message comprises a HyperText Markup Language (HTML) formatted email message or an eXtensible Markup Language (XML) formatted email message.

9. The method of claim 8, wherein said determining an approximate display location of one or more embedded images comprises parsing one or more of HTML code, plain text and Multipurpose Internet Mail Extension (MIME) parts of the HTML formatted email message.

10. The method of claim 9, wherein said determining an approximate display location of one or more embedded images further comprises identifying a displaying line of the email message just prior to the one or more embedded images and calculating the approximate displaying location based on a display location of the displaying line.

11. The method of claim 6, wherein a portion of the text included in the one or more embedded images comprises light text in the context of a dark background.

12. The method of claim 6, wherein a portion of the text included in the one or more embedded images comprises dark text in the context of a light background.

13. The method of claim 6, wherein the one or more abnormal factors include illegal base64 encoding, a plurality of continuous images within one HyperText Markup Language (HTML) part, lower entropy of frames in an animated Graphic Interchange Format (GIF) image or illegal chunk data of Portable Network Graphics (PNG) image.

14. The method of claim 6, wherein image data associated with an embedded image of the one or more embedded images is sent with the email message.

15. The method of claim 6, wherein image data associated with an embedded image of the one or more embedded images is retrieved once a recipient views the email message.

16. The method of claim 6, wherein an embedded image of the one or more embedded images is contained within a file attached to the email message.

17. The method of claim 16, wherein the attached file comprises a Portable Document Format (PDF) file, an Encapsulated PostScript file, a SWF file, a Windows Metafile file, an AutoCAD DXF file or a CorelDraw CDR file.

18. The method of claim 6, wherein file formats of the one or more embedded images are selected from a group comprising Graphic Interchange Format (GIF), Joint Photographic Experts Group (JPEG) and Portable Network Graphics (PNG), Progressive Graphics File (PGF), Tagged Image File Format (TIFF), bit mapped format (BMP), HDP, WDP, XPM, MacOS-PICT, Irix-RGB, Multiresolution Seamless Image Database (MrSID), RAW format, vector format, Scalable Vector Graphics (SVG), Portable Document Format (PDF), Encapsulated PostScript, SWF, Windows Metafile, AutoCAD DXF and CorelDraw CDR.

19. A non-transitory computer-readable storage medium having tangibly embodied thereon instructions, which when executed by one or more processors of one or more computer systems cause the one or more processors to perform a method comprising:

converting an embedded image of an electronic mail (email) message to a binarized representation by performing thresholding on a grayscale representation of the embedded image;

quantifying, by the anti-spam module, a number of text strings that are included in the embedded image by analyzing one or more blocks of the binarized representation with a text string measurement algorithm;

classifying, by the anti-spam module, the email message as spam or clean based at least in part on the number of text strings; and wherein the one or more blocks comprise M×N virtual blocks and wherein the text string measurement algorithm employs equations having a general form as follows:

$$T = \sum_{m=0}^{M} \sum_{n=0}^{N} T^{m,n}$$

subject to:

$$T^{m,n} = \sum_{y_t=y_0^m}^{y_{max}^m} \sum_{y_b=y_t+1}^{y_{max}^m} T_{y_t,y_b}^{m,n}$$

$$y_0^m = \frac{y_{max}}{\partial_0}(m-1), \quad y_{max}^m = y_0^m + \partial_0$$

$$T_{y_t,y_b}^{m,n} = \begin{cases} 1 & \partial_1 > \sum_{i=y_t}^{y_b} CB_i^n > \partial_2 \\ \sum_{k=x_0^n}^{x_{max}^n} B_{k,y_b+1} < \partial_3, & x_0^n = \frac{x_{max}}{\partial_0}(n-1), x_{max}^n = x_0^n + \partial_0 \\ 0 & \text{Otherwise} \end{cases}$$

$$CB_i^n = \begin{cases} 1 & \partial_4 > \sum_{k=x_0^n}^{x_{max}^n} B_{k,i} > \partial_5 \\ & \text{Max}\left(\sum_{k=x_w}^{x_w+\partial_6} B_{k,i}\right) < \partial_7, x_0^n \le x_w \le x_{max}^n \\ 0 & \text{Otherwise} \end{cases}$$

where, $\partial_0 \ldots \partial_7$ are adjustable parameters;

T is the number of text strings;

$T_{y_t,y_b}^{m,n}$ is a likelihood that a row between $y_t$ and $y_b$ in virtual block

[m,n] represents text;

$CB_i^n$ is a likelihood that a line[i] is a part of text; and $B_{k,i}$ is a value of pixel[k,i] in the binary representation.

20. The computer-readable storage medium of claim 19, wherein the embedded image is conveyed formatted in accordance with Graphic Interchange Format (GIF), Joint Photographic Experts Group (JPEG) or Portable Network Graphics (PNG).

21. The computer-readable storage medium of claim 19, wherein the embedded image comprises an image contained within a file attached to the email message.

22. The computer-readable storage medium of claim 20, wherein the method further comprises determining an approximate display location of an embedded image within an electronic mail (email) message.

23. The computer-readable storage medium of claim 20, wherein the method further comprises identifying existence of one or more abnormal factors associated with the embedded image.

24. A non-transitory computer-readable storage medium having tangibly embodied thereon instructions, which when executed by one or more processors of one or more computer systems cause the one or more processors to perform a method comprising:
   determining an approximate display location of one or more embedded images within an electronic mail (email) message;
   identifying existence of one or more abnormal factors associated with the one or more embedded images;
   quantifying, by the anti-spam module, a number of text strings that are included in the embedded image by analyzing one or more blocks of the binarized representation with a text string measurement algorithm; and
   classifying, by the anti-spam module, the email message as spam or clean based on the approximate display location, the existence of one or more abnormal factors and the number of text strings; and
   wherein the one or more blocks comprise M×N virtual blocks and wherein the text string measurement algorithm employs equations having a general form as follows:

$$T = \sum_{m=0}^{M} \sum_{n=0}^{N} T^{m,n}$$

subject to:

$$T^{m,n} = \sum_{y_t=y_0^m}^{y_{max}^m} \sum_{y_b=y_t+1}^{y_{max}^m} T^{m,n}_{y_t,y_b}$$

$$y_0^m = \frac{y_{max}}{\partial_0}(m-1), \quad y_{max}^m = y_0^m + \partial_0$$

$$T^{m,n}_{y_t,y_b} = \begin{cases} 1 & \partial_1 > \sum_{i=y_t}^{y_b} CB_i^n > \partial_2 \\ \sum_{k=x_0^n}^{x_{max}^n} B_{k,y_b+1} < \partial_3, \quad x_0^n = \frac{x_{max}}{\partial_0}(n-1), x_{max}^n = x_0^n + \partial_0 \\ 0 & \text{Otherwise} \end{cases}$$

$$CB_i^n = \begin{cases} 1 & \partial_4 > \sum_{k=x_0^n}^{x_{max}^n} B_{k,i} > \partial_5 \\ \text{Max}\left(\sum_{k=x_w}^{x_w+\partial_6} B_{k,i}\right) < \partial_7, x_0^n \le x_w \le x_{max}^n \\ 0 & \text{Otherwise} \end{cases}$$

where,
   $\partial_0 \ldots \partial_7$ are adjustable parameters;
   T is the number of text strings;
   $T^{m,n}_{y_t,y_b}$ is a likelihood that a row between $y_t$ and $y_b$ in virtual block [m,n] represents text;
   $CB_i^n$ is a likelihood that a line[i] is a part of text; and
   $B_{k,i}$ is a value of pixel[k,i] in the binary representation.

25. The computer-readable storage medium of claim 24, wherein the method further comprises performing image thresholding on grayscale representations of the one or more embedded images.

26. The computer-readable storage medium of claim 24, wherein the email message comprises a HyperText Markup Language (HTML) formatted email message or an eXtensible Markup Language (XML) formatted email message.

27. The computer-readable storage medium of claim 26, wherein said determining an approximate display location of one or more embedded images comprises parsing one or more of HTML code, plain text and Multipurpose Internet Mail Extension (MIME) parts of the HTML formatted email message.

28. The computer-readable storage medium of claim 27, wherein said determining an approximate display location of one or more embedded images further comprises identifying a displaying line of the email message just prior to the one or more embedded images and calculating the approximate displaying location based on a display location of the displaying line.

29. The computer-readable storage medium of claim 24, wherein a portion of the text included in the one or more embedded images comprises light text in the context of a dark background.

30. The computer-readable storage medium of claim 24, wherein a portion of the text included in the one or more embedded images comprises dark text in the context of a light background.

31. The computer-readable storage medium of claim 24, wherein the one or more abnormal factors include illegal base64 encoding, a plurality continues images within one HyperText Markup Language (HTML) part, lower entropy of frames in an animated Graphic Interchange Format (GIF) image or illegal chunk data of Portable Network Graphics (PNG) image.

32. The computer-readable storage medium of claim 24, wherein image data associated with an embedded image of the one or more embedded images is sent with the email message.

33. The computer-readable storage medium of claim 24, wherein image data associated with an embedded image of the one or more embedded images is retrieved once a recipient views the email message.

34. The computer-readable storage medium of claim 24, wherein an embedded image of the one or more embedded images is contained within a file attached to the email message.

35. The computer-readable storage medium of claim 34, wherein the attached file comprises a Portable Document Format (PDF) file, an Encapsulated PostScript file, a SWF file, a Windows Metafile file, an AutoCAD DXF file or a CorelDraw CDR file.

36. The computer-readable storage medium of claim 24, wherein file formats of the one or more embedded images are selected from a group comprising Graphic Interchange Format (GIF), Joint Photographic Experts Group (JPEG) and Portable Network Graphics (PNG), Progressive Graphics File (PGF), Tagged Image File Format (TIFF), bit mapped format (BMP), HDP, WDP, XPM, MacOS-PICT, Irix-RGB, Multiresolution Seamless Image Database (MrSID), RAW format, vector format, Scalable Vector Graphics (SVG), Portable Document Format (PDF), Encapsulated PostScript, SWF, Windows Metafile, AutoCAD DXF and CorelDraw CDR.

37. An electronic mail (email) security system comprising:

a non-transitory storage device having tangibly embodied thereon instructions associated with an anti-spam module; and one or more processors coupled to the non-transitory storage device and operable to execute the instructions associated with the anti-spam module to perform a method comprising:

converting an embedded image of an email message to a binarized representation by performing thresholding on a grayscale representation of the embedded image;

quantifying a number of text strings that are included in the embedded image by analyzing one or more blocks of the binarized representation with a text string measurement algorithm;

classifying the email message as spam or clean based at least in part on the number of text strings; and wherein the one or more blocks comprise M×N virtual blocks and wherein the text string measurement algorithm employs equations having a general form as follows:

$$T = \sum_{m=0}^{M}\sum_{n=0}^{N} T^{m,n}$$

subject to:

$$T^{m,n} = \sum_{y_t=y_0^m}^{y_{max}^m}\sum_{y_b=y_t+1}^{y_{max}^m} T^{m,n}_{y_t,y_b}$$

$$y_0^m = \frac{y_{max}}{\partial_0}(m-1), \; y_{max}^m = y_0^m + \partial_0$$

-continued $$T^{m,n}_{y_t,y_b} = \begin{cases} 1 & \partial_1 > \sum_{i=y_t}^{y_b} CB_i^n > \partial_2 \\ \sum_{k=x_0^n}^{x_{max}^n} B_{k,y_b+1} < \partial_3, \; x_0^n = \frac{x_{max}}{\partial_0}(n-1), \; x_{max}^n = x_0^n + \partial_0 \\ 0 & \text{Otherwise} \end{cases}$$

$$CB_i^n = \begin{cases} 1 & \partial_4 > \sum_{k=x_0^n}^{x_{max}^n} B_{k,i} > \partial_5 \\ & \text{Max}\left(\sum_{k=x_w}^{x_w+\partial_6} B_{k,i}\right) < \partial_7, \; x_0^n \le x_w \le x_{max}^n \\ 0 & \text{Otherwise} \end{cases}$$

where, $\partial_0 \ldots \partial_7$ are adjustable parameters;

T is the number of text strings;

$T^{m,n}_{y_t,y_b}$ is a likelihood that a row between $y_t$ and $y_b$ in virtual block [m,n] represents text;

$CB_i^n$ is a likelihood that a line[i] is a part of text; and $B_{k,i}$ is a value of pixel[k,i] in the binary representation.

38. The system of claim 37, wherein the embedded image is conveyed formatted in accordance with Graphic Interchange Format (GIF), Joint Photographic Experts Group (JPEG) or Portable Network Graphics (PNG).

39. The system of claim 37, wherein the embedded image comprises an image contained within a file attached to the email message.

40. The system of claim 38, wherein the method further comprises determining an approximate display location of an embedded image within an email message.

41. The system of claim 38, wherein the method further comprises identifying existence of one or more abnormal factors associated with the embedded image.

\* \* \* \* \*